United States Patent [19]
Stanley

[11] Patent Number: 5,783,074
[45] Date of Patent: Jul. 21, 1998

[54] MAGNETIC FLUID CONDITIONER

[76] Inventor: David Stanley, 3140 Ambassador Caffery Pkwy., Lafayette, La. 70506

[21] Appl. No.: 779,917

[22] Filed: Jan. 7, 1997

Related U.S. Application Data

[63] Continuation of Ser. No. 509,862, Aug. 1, 1995, abandoned.

[51] Int. Cl.$^6$ .................................................. C02F 1/48
[52] U.S. Cl. ................................... 210/222; 96/1
[58] Field of Search ........................... 210/222, 695; 96/1, 2; 123/536, 538

[56] References Cited

U.S. PATENT DOCUMENTS

| | | | |
|---|---|---|---|
| 4,278,549 | 7/1981 | Abrams | 210/222 |
| 5,052,491 | 10/1991 | Harms | 210/222 |
| 5,122,277 | 6/1992 | Jones | 210/222 |
| 5,178,757 | 1/1993 | Comey | 210/222 |
| 5,453,188 | 9/1995 | Florescu et al. | 210/222 |

FOREIGN PATENT DOCUMENTS

| | | | |
|---|---|---|---|
| 1089058 | 4/1984 | U.S.S.R. | 210/222 |

*Primary Examiner*—Matthew O. Savage

[57] ABSTRACT

The magnetic fluid conditioner consists of an outer casing [30] with an inner flow sleeve [20] that has a venturi shaped flow slot [60]. Flow sleeve [20] houses the permanent magnets [10] arranged around the flow venturi [60] to provide disruptive magnetic deflecting forces on a chemical species that flows through the tool. A non-magnetic metal material or ceramic magnet material [40] not oriented during the manufacturing process provides the path for the magnetic flux circuits between each bank of permanent magnets [10]. A surface enhancement polymer coating [70] is applied to all metal parts housed inside outer cylindrical pipe [30] to prevent galvanic corrosion between the metals. The configuration of the magnets [10] in flow sleeve [20] provides horizontal and vertical magnetic flux fields that are perpendicular to the direction of fluid flow through flow slot [60] resulting in the maximum magnetic deflecting forces on the chemical species flowing through flow slot [60] based on the physics of Faraday's Law of Induction and the Lorenz Equation. The magnetic deflecting forces alters the growth pattern of paraffin, scale and other infected fluids thus inhibiting the build-up of depositional solids in the flowline.

1 Claim, 5 Drawing Sheets

MAGNETIC FLUID CONDITIONER

CROSS-REFERENCES TO RELATED APPLICATIONS

This magnetic fluid conditioner is related to my Disclosure Document applications Ser. No. 352729 and Ser. No. 349022 that are on file at the U.S. Patent and Trademark Office in Washington, D.C., and is a continuation of U.S. patent application Ser. No. 08/509,862, filed Aug. 1, 1995, now abandoned.

BACKGROUND

1. Field of Invention

The magnetic fluid conditioner consists of an outer casing with an inner flow sleeve with a flow venturi that has permanent magnets arranged around the flow venturi to provide disruptive spiral magnetic deflecting forces on a chemical species flowing through the tool to prevent asphaltene, paraffin, and scale deposition problems in flowlines.

2. Discussion of Prior Art

Magnetic fluid conditioners were used in Russian industry for many years to treat water scale deposition problems. It has been known in Russia for some time that exposing a fluid to a magnetic field will cause a change in some of the solids that form in the fluid.

Magnetism has been applied to many different fluids that have a variety of scaling ingredients such as calcium salts, magnesium salts, sodium salts, algae, paraffin wax, carbon and hydrocarbons. There are several factors that are involved in the successful magnetic treatment of fluids. These factors are summarized as follows:

1. Magnetic field.
2. Fluid conductor (water).
3. Relative motion between the magnetic field and the conductor.
4. Angle between the magnetic flux field and the direction of the fluid flow.

The major breakthrough in the United States with the magnetic treatment of fluids came from Dean L. Moody who was developing magnetic units in the late 1950's and 1960's. Mr. Moody received a U.S. Pat. No. 3,228,878 on his diamagnetic theory and application in 1966.

Prior art magnetic tools have consisted of little more than a means of suspending magnets around a piping system through which the fluid passes. Tools that are designed were the angle between the magnetic flux fields and the direction of flow of the chemical species through the tool is 0° or 180° are ineffective. The optimum magnetic treatment of the fluid occurs when the angle between the magnetic flux field and the direction of the flow of the chemical species through the tool is 90°. This is based on the physics of Faraday's Law of Induction and the Lorenz Equation.

A review of the prior art shows that the magnets are attached or contacts a metal surface that will create a galvanic corrosion problem for the magnets. The magnets are anoidic to the cathodic metal that houses them. This results in the transfer of electrons from the smaller magnets to the large metal container that holds the magnets. Furthermore, the metal container that houses the magnets is attached to an even larger cathodic metal pipeline that will prolong the galvanic corrosion time.

Summarized below is my review of the prior art on magnetic fluid conditioners:

U.S. Pat. No. 5,178,757 [Corney]:

A magnetic tool for conditioning fluids includes a hollow core providing at least one passage through which the fluid to be treated flows. An array of magnets extends longitudinally along the core with the poles of the magnets arranged to provide a magnetic field perpendicular to the flow path to enhance the magnetic conditioning effect of the tool.

This design is good since the angle between the magnetic force fields and the direction of the fluid flow is 90°. However, this magnet configuration design is not capable of providing a disruptive spiral magnetic deflecting force to the fluid treated and is not the optimum design. Also, the tool has had plugging problems in field applications due to the narrow flow slot design and will have galvanic corrosion problems due to the attachment of the smaller anoidic magnets to the larger cathodic tool and piping system.

U.S. Pat. No. 5,122,277 [Jones]:

This patent shows an apparatus and method for conditioning fluid in a flow line. A magnet is placed around a section of the flow line such that one pole, having a desired polarity, is facing the flow line. The tool produces magnetic flux lines in a circular path throughout the direction of the fluid flow. The majority of the magnetic flux lines are parallel to the direction of the fluid flow. Thus, the only effective magnetic treatment of the fluid occurs when the angle between the magnetic flux lines and the direction of fluid flow is between 0° and 180° with the maximum magnetic treatment occurring at 90°.

U.S. Pat. No. 5,052,491 [Harms et al]:

An oil tool and method for controlling the accumulation of paraffin and deposits in downhole oil strings and oil transmission flow lines. The tool employs at least two magnets having their north pole and south pole aligned in opposite directions and held in place in relation to a magnetic outer shield or casing by a non-magnetic restraining ring. The tool provides a magnetic field that is 0° to 180° to the direction of fluid flow through the tool. A majority of the magnetic force fields are parallel to the direction of the fluid flow. This results in no magnetic treatment of the fluid. The only magnetic treatment of the fluid occurs when the angle between the magnetic flux field and the direction of the fluid flow is between 0° and 180° with the maximum magnetic treatment occurring at 90°.

U.S. Pat. No. 4,278,549 [Abrams & Maynard]

Method and apparatus for magnetically treating aqueous and non-aqueous liquid streams to enhance their flow properties and to reduce their tendency to deposit scales, encrustations and the like, wherein the liquid stream for treatment, either immediately prior to or substantially simultaneously with its traversal of a high density, magnetic flux field having a normal orientation with respect to the primary flow path of the liquid stream is deflected along secondary flow paths angularly displaced from the primary flow path causing in effect a high velocity, essentially shear angle traversal of the flux field by said stream. Apparatus thereof includes a plurality of permanent magnet groups arranged in parallel within a hollow casing or housing, each said groups comprising a plurality of superposed, elongated magnets in registered, overlying relationship polarized along their longitudinal axis, the latter being parallel to the primary flow path, the adjacent magnet groups providing liquid passageways therebetween and generating magnetic flux paths essentially normal to the primary flow path.

U.S. Pat. No. 4,278,549 [Abrams & Maynard] is similar to U.S. Pat. No. 5,178,757 [Corney] in the design of multiple flow paths and the magnetic flux fields where the magnetic flux paths are normal to the primary flow path. However, this patent like the Corney patent does not impart a disruptive spiral magnetic force to a chemical species flowing through the tool. Also, the small flow slot design increases the probability of potential plugging of the tool in actual field applications.

U.S. Pat. No. 3,228,878 [Moody]:

The Moody tool consists of little more than a means of suspending magnets around the outside of a piping system through which the fluid passes and is a method of treating liquid containing diamagnetic substances which comprises causing it to flow through a closed passageway, subjecting the body of flowing liquid throughout a zone of said passageway to a stable magnetic field having two polar zones and of a strength to saturate the body of liquid within said field, and conducting said flowing liquid leaving said field without substantial turbulence of flow or external magnetic influence a distance of at least ten times the distance of its flow through said magnetic field, and maintaining the rate of said flow at less than one-half foot per second. The tool provides a magnetic field that is 0° to 180° to the direction of fluid flow through the tool. A majority of the magnetic force fields are parallel to the direction of the fluid flow. This results in no magnetic treatment of the fluid. The only magnetic treatment of the fluid occurs when the angle between the magnetic flux field and the direction of the fluid flow is between 0° and 180° with the maximum magnetic treatment occurring at 90°.

OBJECTS AND ADVANTAGES

Accordingly, several objects and advantages of my magnetic fluid conditioner are:

1. The maximum flow area design of the flow sleeve to reduce clogging problems.
2. The magnet configuration is designed to impart a disruptive spiral magnetic deflecting force to a chemical species flowing through the tool. This design is based on the maximization of the magnetic deflecting force according to the physics of Faraday's Law of Induction and the Lorenz equation.
3. An inner flow sleeve that can be changed without replacing the whole tool due to a change of the magnetic susceptibility of the fluid treated. An example would be the recompletion of an oil well from a producing zone that has a paraffin deposition problem to a new producing zone that has a scale deposition problem. This makes the tool more cost effect than other tools in the marketplace.
4. The use of surface enhancement polymer to coat the flow sleeve will reduce the flow friction in the flow sleeve thereby increasing the flow rate of the fluid through the tool thereby enhancing the magnetic treatment of the fluid.
5. The coating of all inner metal parts of the tool with a surface enhancement polymer coating will prevent any possible galvanic corrosion problems. This will increase the life of the tool in harsh corrosive environments such as a downhole oil well application.

Further objects and advantages of my magnetic fluid conditioner will become apparent from a consideration of the drawings and ensuing description.

LIST OF REFERENCE NUMERALS

| Number | Description |
|---|---|
| 10 | Permanent Magnets. |
| 20 | How sleeve made of a metal such as stainless steel or titanium or a polymer material such as a reinforced plastic composite or a engineering thermoplastic. |
| 30 | Outer pipe that houses the flow sleeve. The pipe can be made of metal, a polymer material or a reinforced plastic composite. |
| 40 | Non-magnetic metal material or ceramic magnet material not oriented during the manufacturing process. |
| 50 | Threaded ends of outer casing so tool can be attached to an existing pipe or flow line. |
| 60 | The flow slot with the venturi design made of a metal such as stainless steel or titanium. |
| 70 | A surface enhancement polymer coating. |
| 80 | Magnetic flux path. |

SUMMARY

My magnetic fluid conditioner consists of an outer casing with an inner flow sleeve that has permanent magnets arranged around the flow venturi to provide disruptive spiral magnetic deflecting forces on a chemical species that passes through the tool. The configuration of the magnets in the flow sleeve provides horizontal and vertical magnetic force fields that are perpendicular to the direction of fluid flow through the tool. The spiral magnetic deflecting forces alters the growth pattern of paraffin, scale and other infected fluids thus inhibiting the build-up of depositional solids.

DESCRIPTION OF INVENTION

Figure 1:
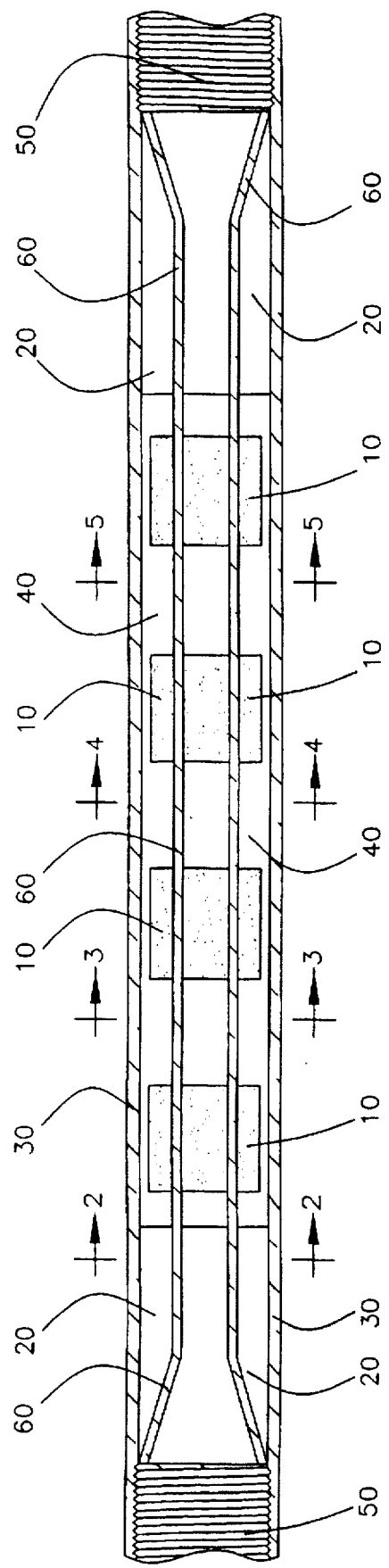
FIG. 1 is a side view of the invention.
Figure 3:
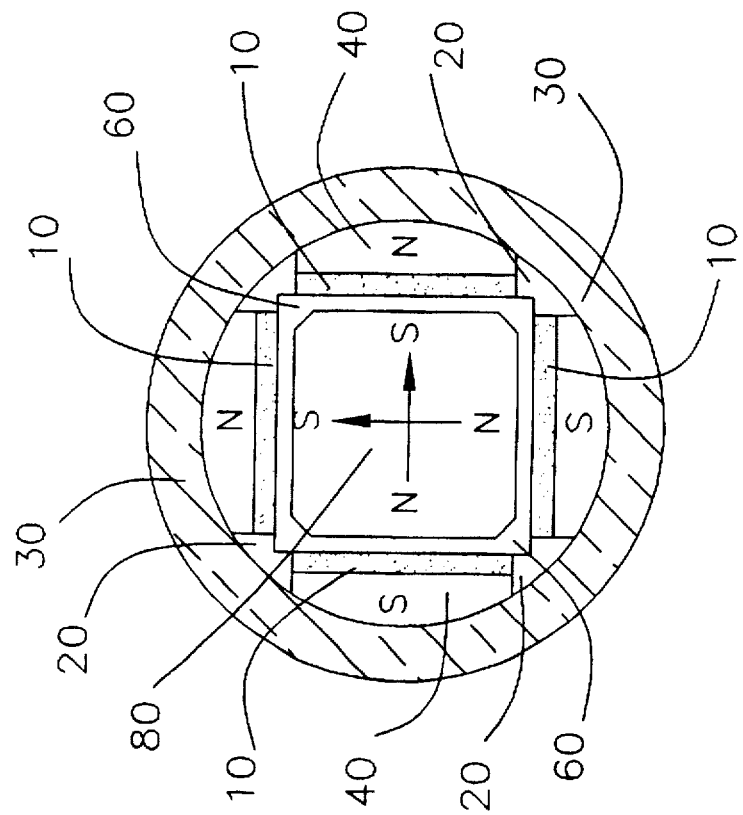
FIG. 3 is a cross sectional view of section 3—3 of FIG. 1.
Figure 2:
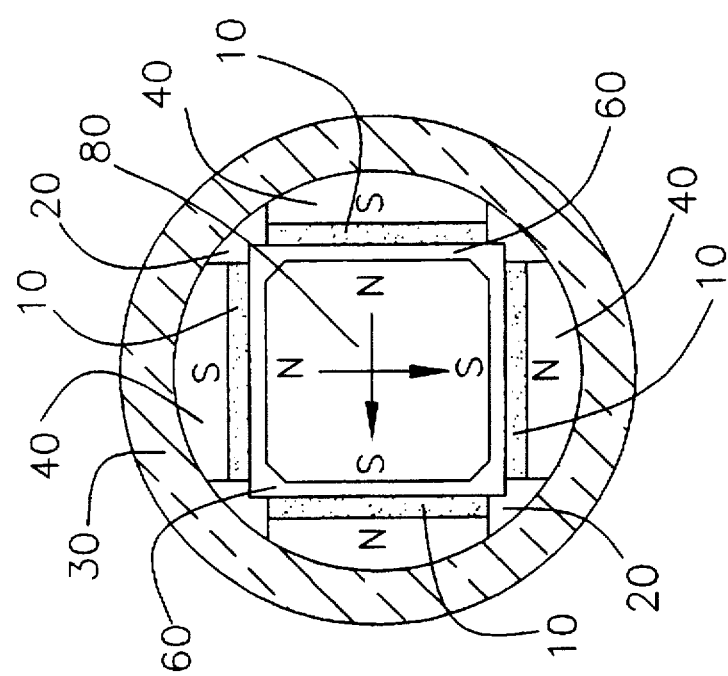
FIG. 2 is a cross sectional view of section 2—2 of FIG. 1.
Figure 5:
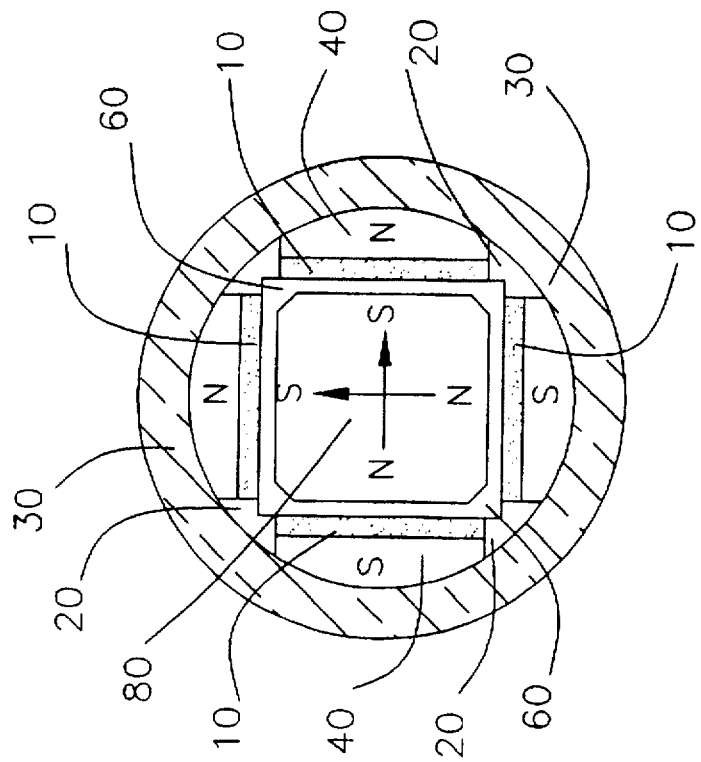
FIG. 5 is a cross sectional view of section 5—5 of FIG. 1.
Figure 4:
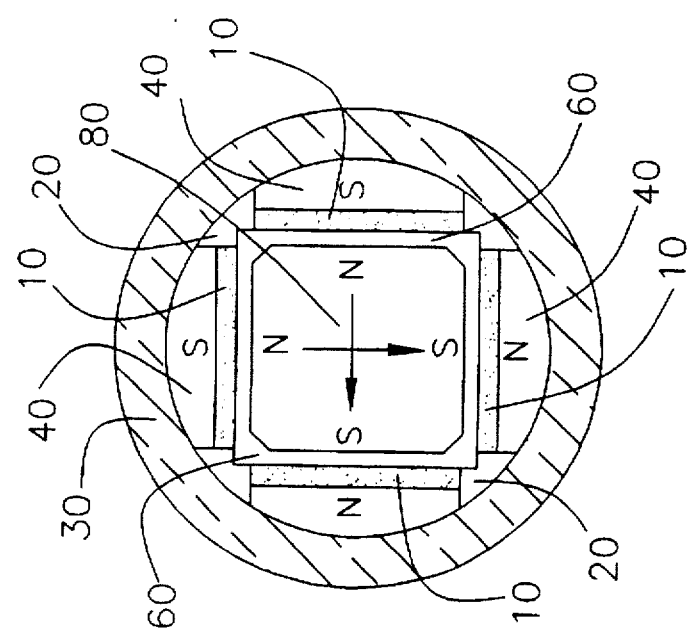
FIG. 4 is a cross sectional view of section 4—4 of FIG. 1.
Figure 6:
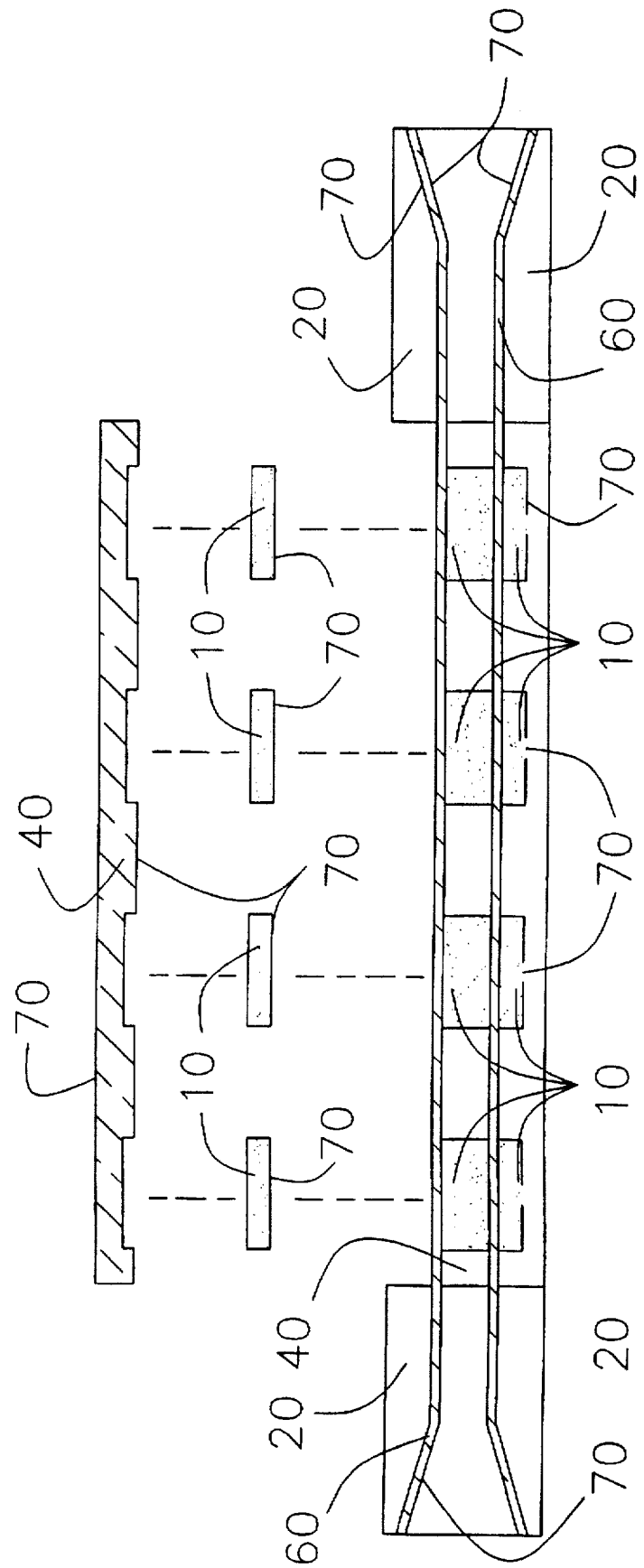
FIG. 6 is an exploded side view of the invention.
Figure 7:
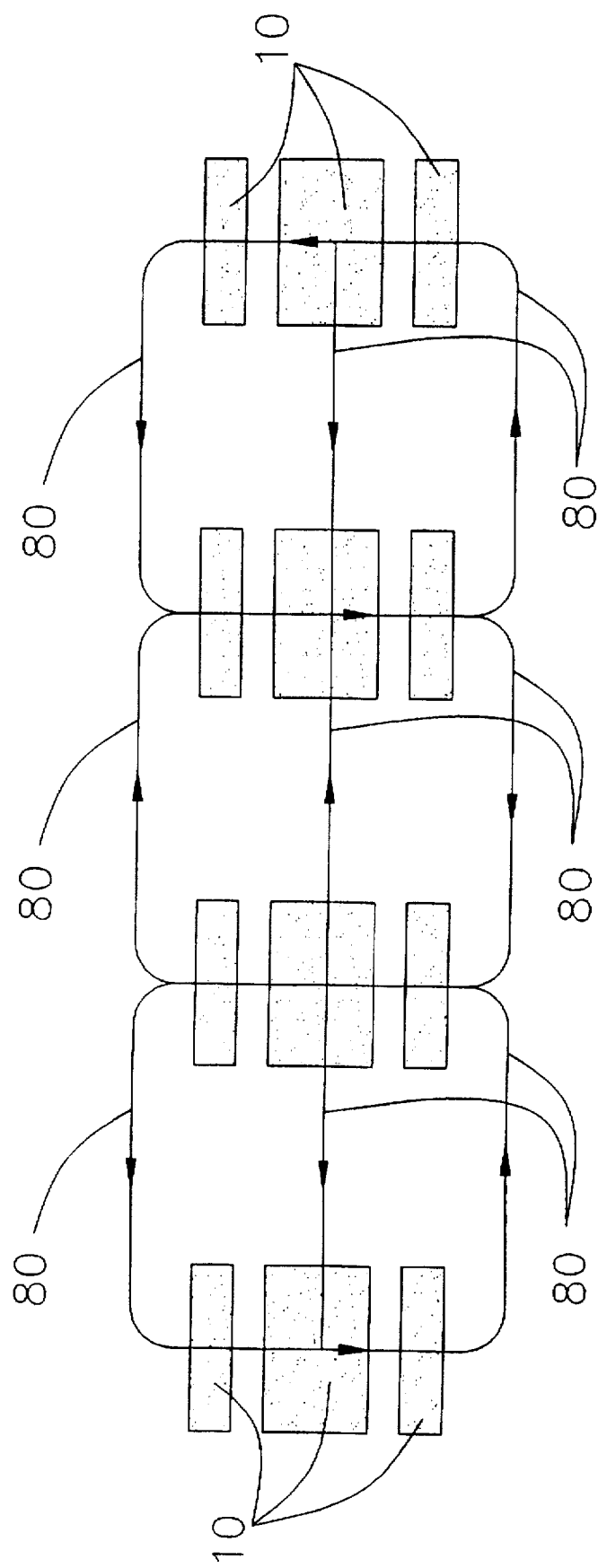
FIG. 7 shows a magnetic flux path produced by the invention.

FIG. 1 shows a side view of the magnetic fluid conditioner. An outer cylindrical pipe [30] houses a flow sleeve [20]. Flow sleeve [20] houses a flow slot with a venturi design [60] that provides the flow path for the fluids through flow sleeve [20]. Permanent magnets [10] are arranged in flow sleeve [20] in the same vertical plane that is perpendicular to the longitudinal axis as illustrated by Sections 2 through 5 in FIG. 1. A non-magnetic metal material or ceramic magnet material [40] not oriented during the manufacturing process provides the path for the magnetic flux circuits. A surface enhancement polymer coating [70] is applied to all metal parts housed inside outer cylindrical pipe [30].

OPERATION OF INVENTION

The magnetic treatment of fluids is based on the physics of Faraday's Law of Induction and the Lorenz Equation:

$$F = Q \times E + Q \times [V \times B] \mathrm{Sine}[A] \; [V,B]$$

Where:

F=Vector quantity of the magnetic force.

Q=Charge of the chemical species.

E=Electrical field vector quanity.

V=Velocity vector of the chemical species.

B=Magnetic flux field vector.

A=The angle between the velocity vector [V] direction of the chemical species and the magnetic flux field vector [B].

On the basis of the above equation the maximum magnetic force [F] occurs when [A] equals 90° since the sine of 90° is one assuming [V] is at the maximum flow rate and [B] is constant. When [A] equals 0° or 180° the sine of these angles equals zero and the magnetic force [F] is zero. When the angle between [V] and [B] is between 0° to 90° and 90° to 180° there is some magnetic treatment of the fluid. The magnitude of the treatment will depend on the sine of the angle between [V] and [B] and the rate of flow [V] of the fluid through the magnetic fields. Since there are no electrodes in the fluid to provide a complete electrical circuit the value of [E] is zero.

Therefore, $$F_{max} = Q \cdot [V.B] \cdot \text{Sine } 90°$$

This represents the scientific basis of the design of the magnetic force fields of my magnetic fluid conditioner tool. When a chemical species enters flow sleeve [20] and flows through flow slot [60] it encounters vertical and horizontal magnetic forces due to the magnet configuration design [10] shown in FIGS. 1 through 7. This imparts a spiral action to the chemical species as it flows through the tool. A non-magnetic metal material or ceramic magnet material not oriented during the manufacturing process [40] provides the magnet flux circuit path from one bank of magnets to the next bank of magnets. The speed of the chemical species will increase as it enters the smaller flow area in flow slot [60] of flow sleeve [20]. Coating flow slot [60] with a surface enhancement polymer material such as an engineering thermoplastic or thermoset plastic [70] will reduce the friction of the flowing fluid and thereby increase the flow rate. The engineering thermoplastic or thermoset plastic material provides high thermal and electrical resistance qualities with good mechanical qualities. The use of perpendicular magnetic flux fields to the direction of flow and relative motion of the chemical species flowing through the magnetic fluid conditioner results in the optimum design based on the physics of Faraday's Law of Induction and the Lorenz Equation.

CONCLUSION, RAMIFICATIONS, AND SCOPE OF INVENTION

Thus, the reader will appreciate my magnetic fluid conditioner's flow sleeve design and the magnet configuration that imparts disruptive magnetic deflecting forces on a chemical species flowing through the tool. My magnetic fluid conditioner provides a highly corrosion resistant, lightweight, yet economical device that industry can use in the prevention of asphaltene, paraffin, and scale deposition problems in flow lines. The coating of the flow slot with a surface enhancement polymer reduces friction and increases the flow rate of the fluid flowing through the tool. This allows the increase of the flow slot venturi cross sectional area to a maximum design to help prevent any clogging problems experienced by some magnetic fluid conditioners in the marketplace. Also, the coating of all internal metal parts with a surface enhancement polymer material will prevent galvanic corrosion that would quickly destroy the smaller anoidic magnets.

While my above description contains many specifications, these should not be construed as limitations on the scope of the magnetic fluid conditioner, but rather as an exemplification of one preferred embodiment thereof. Many other variations are possible. For example, the complete tool except for the magnets can be made of a composite reinforced plastic material. Also, the tool can be made of a combination of metal and a composite reinforced plastic. For example, the inner flow sleeve can be made of stainless steel or titanium that is coated with a surface enhancement polymer to prevent any erosion corrosion problems. On the basis of Faraday's Law of Induction and the Lorenz Equation my magnetic fluid conditioner tool is the best design possible based on the physics involved. My tool's simple design affords lower cost to manufacturer as compared to the tool's currently in the marketplace.

I claim:

1. An apparatus for magnetically treating a fluid comprising:

a tubular conduit including opposite first and second open ends, said conduit having an outer peripheral surface surrounding a longitudinal axis;

a plurality of banks of magnets mounted on the outer peripheral surface of said conduit, wherein said banks are axially spaced apart from one another with respect to said longitudinal axis, wherein each said bank includes four magnets each having respective planar pole surfaces mounted on the outer peripheral surface of said conduit, wherein the planar pole surface of each said magnet in a respective said bank is parallel to said longitudinal axis and oriented at right angles to the planar pole surface of an adjacent said magnet in the respective said bank, and wherein the planar pole surface of each said magnet in each said bank is coplanar with the planar pole surface of an adjacent said magnet in an adjacent said bank; wherein each confronting pair of said four magnets in each respective said bank have planar pole surfaces that are parallel to one another and have opposite magnetic polarities, and wherein the magnetic polarity of the planar pole surface of each said magnet in a respective said bank is opposite to the magnetic polarity of the planar pole surface of an adjacent said magnet in an adjacent said bank.

* * * * *